United States Patent
Lee et al.

(10) Patent No.: US 11,072,282 B2
(45) Date of Patent: Jul. 27, 2021

(54) APPARATUS FOR CONTROLLING DISPLAY MIRROR FOR VEHICLE

(71) Applicant: SL Corporation, Daegu (KR)

(72) Inventors: Minhee Lee, Gyengsangbuk-do (KR); Su Young Choi, Gyengsangbuk-do (KR); Jinhwan Moon, Gyengsangbuk-do (KR); Seokkeon Kwon, Gyengsangbuk-do (KR); Changju Kim, Gyengsangbuk-do (KR); Jung Yeol Ye, Gyengsangbuk-do (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 16/685,839

(22) Filed: Nov. 15, 2019

(65) Prior Publication Data

US 2020/0189464 A1 Jun. 18, 2020

(30) Foreign Application Priority Data

Dec. 13, 2018 (KR) ........................ 10-2018-0161209

(51) Int. Cl.
*B60R 1/00* (2006.01)
*H04N 7/18* (2006.01)
*G06F 1/3218* (2019.01)
*B60R 11/02* (2006.01)
*B60R 1/12* (2006.01)
(Continued)

(52) U.S. Cl.
CPC ................. *B60R 1/00* (2013.01); *B60R 1/12* (2013.01); *B60R 11/0235* (2013.01); *G06F 1/3218* (2013.01); *G06F 1/3265* (2013.01); *H04N 7/183* (2013.01); *B60R 2001/1215* (2013.01); *B60R 2011/0033* (2013.01)

(58) Field of Classification Search
CPC ......... B60R 1/00; B60R 1/12; B60R 11/0235; B60R 2001/1215; B60R 2001/0033; G06F 1/3218; G06F 1/3265; H04N 7/183
See application file for complete search history.

(56) References Cited

U.S. PATENT DOCUMENTS 5,614,923 A * 3/1997 Gotou .................. G09G 3/3696
345/100
6,642,851 B2 * 11/2003 Deline .................. B60K 35/00
340/815.4
(Continued)

*Primary Examiner* — Michael E Teitelbaum
(74) *Attorney, Agent, or Firm* — Nelson Mullins Riley & Scarborough LLP; Kongsik Kim, Esq.

(57) ABSTRACT

The apparatus for controlling a display mirror for a vehicle includes an operation mode determiner for determining an operation mode based on a position of a mirror assembly, the mirror assembly accommodating a display for displaying an image obtained by an imaging device within an inner space formed by a mirror coupled to a surface of a mirror housing; a power supply for supplying a power to the display; and a controller configured to adjust an intensity of the power supplied to the display based on the determined operation mode. The operation mode determiner determines between a first operation mode in which an image reflected by the mirror is visible to a driver and a second operation mode in which the image obtained by the imaging device is displayed on the display. In particular, the display remains turned on in the first operation mode and the second operation mode.

11 Claims, 8 Drawing Sheets

| OPERATION MODE | POSITION OF MIRROR ASSEMBLY |
|---|---|
| FIRST OPERATION MODE | |
| SECOND OPERATION MODE | |

(51) Int. Cl.
*G06F 1/3234* (2019.01)
*B60R 11/00* (2006.01)

(56) References Cited

U.S. PATENT DOCUMENTS

| | | | | |
|---|---|---|---|---|
| 7,779,278 | B2 * | 8/2010 | DuBose | H02M 3/33523 |
| | | | | 323/271 |
| 9,713,985 | B2 * | 7/2017 | Konuki | B60R 1/00 |
| 2009/0243824 | A1 * | 10/2009 | Peterson | B60R 1/12 |
| | | | | 340/435 |
| 2012/0062743 | A1 * | 3/2012 | Lynam | B60W 50/0098 |
| | | | | 348/148 |
| 2013/0307984 | A1 * | 11/2013 | Pan | G09F 23/00 |
| | | | | 348/148 |
| 2016/0082890 | A1 * | 3/2016 | Habibi | B60R 1/08 |
| | | | | 348/148 |

\* cited by examiner

| OPERATION MODE | POSITION OF MIRROR ASSEMBLY |
|---|---|
| FIRST OPERATION MODE |  |
| SECOND OPERATION MODE |  |

APPARATUS FOR CONTROLLING DISPLAY MIRROR FOR VEHICLE

CROSS-REFERENCE TO RELATED APPLICATION

This application claims the benefit of priority from Korean Patent Application No. 10-2018-0161209 filed on Dec. 13, 2018, which application in its entirety is herein incorporated by reference.

BACKGROUND

1. Technical Field

The present disclosure relates to an apparatus for controlling a display mirror for a vehicle, and more specifically, to an apparatus for controlling a display mirror for a vehicle that enables to check an image corresponding to a rear view reflected by a mirror and an image obtained and displayed by an imaging device.

2. Description of the Related Art

Generally, a vehicle is equipped with a windshield to block the wind blowing from the front when the vehicle is operated, to prevent foreign matter from entering the vehicle, and to secure a forward view. In addition to the windshield, the vehicle is equipped with an inside mirror and an outside mirror to secure a rear view and a side rear view near both front doors of the vehicle. The inside mirror is disposed near a top of the front windshield of the vehicle, and allows a driver to secure the rear view to provide information such as a distance to a following vehicle.

Recently, for the convenience of the driver, the inside mirror may display an image obtained by an imaging device as well as an image corresponding to the rear view reflected by the mirror. However, in this case, the image corresponding to the rear view reflected by the mirror and the image obtained and displayed by the imaging device overlap with each other. Therefore, it is difficult for the driver to perceive the rear view correctly.

Due to this problem, when the image corresponding to the rear view is reflected by the mirror and shown to the driver, the display is turned off to prevent providing a deteriorated rear view to the driver. However, in this case, since the display is turned off, the utilization of the display is reduced.

Accordingly, a method for enabling the display to be utilized is required even when the image corresponding to the rear view is reflected by the mirror and shown to the driver.

SUMMARY

Aspects of the present disclosure provide an apparatus for controlling a display mirror for a vehicle that allows a driver to more easily check vehicle-related information by maintaining a display in an on-state even when an image corresponding to a rear view of the vehicle is reflected by the mirror and shown to the driver.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, an apparatus for controlling a display mirror for a vehicle may include an operation mode determiner for determining an operation mode based on a position of a mirror assembly, the mirror assembly accommodating a display for displaying an image obtained by an imaging device within an inner space formed by a mirror coupled to a surface of a mirror housing; a power supply for supplying a power to the display; and a controller configured to adjust an intensity of the power supplied to the display based on the determined operation mode. The operation mode determiner may determine between a first operation mode in which an image reflected by the mirror is visible to a driver and a second operation mode in which the image obtained by the imaging device is displayed on the display. The display may remain turned on in the first operation mode and the second operation mode. Other features and embodiments may be apparent from the following detailed description, the drawings, and the claims.

An apparatus for controlling a display mirror for a vehicle according to the present disclosure may include one or more of the following benefits. Even when an image corresponding to a rear view of a vehicle is reflected by the mirror and shown to a driver, a display displaying an image obtained by an imaging device may remain turned on. Therefore, vehicle-related information may be checked via the display, thereby increasing the utilization of the display and improving driver convenience.

The benefits of the present disclosure are not limited to the above-mentioned benefits, and other benefits not mentioned may be clearly understood by a person skilled in the art.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
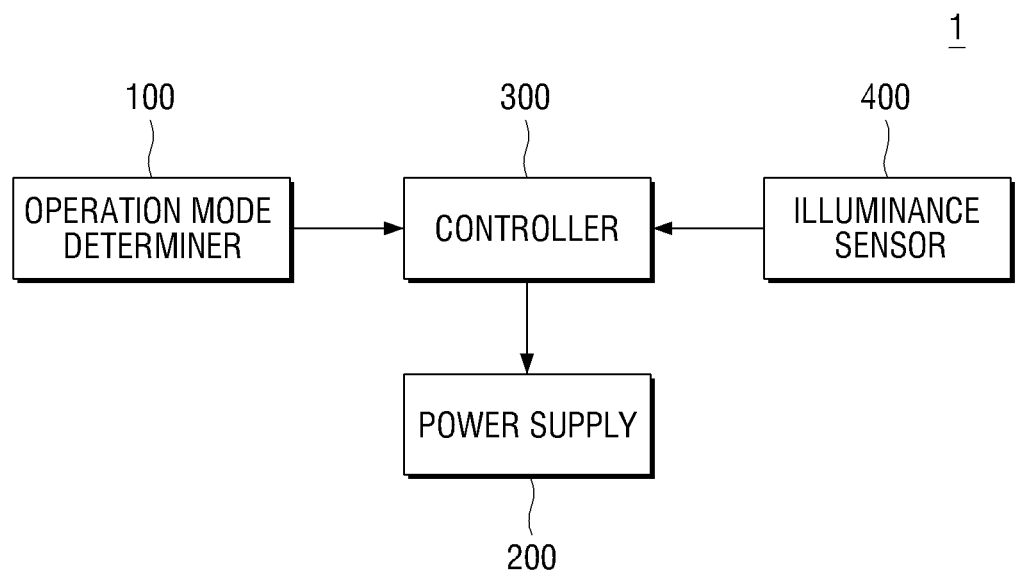
FIG. 1 is a block diagram showing an apparatus for controlling a display mirror for a vehicle according to an exemplary embodiment of the present disclosure.

Advantages and features of the present disclosure and methods of accomplishing the same may be understood more readily by reference to the following detailed description of exemplary embodiments and the accompanying drawings. The present disclosure, however, may be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present disclosure will only be defined by the appended claims. Throughout the specification, like reference numerals in the drawings denote like elements.

In some exemplary embodiments, well-known steps, structures and techniques will not be described in detail to avoid obscuring the disclosure.

The terminology used herein is for the purpose of describing particular exemplary embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments of the present disclosure are described herein with reference to plan and cross-sectional views that are schematic illustrations of idealized exemplary embodiments of the present disclosure. As such, variations from the shapes of the illustrations as a result, for example, of manufacturing techniques and/or tolerances, are to be expected. Thus, exemplary embodiments of the present disclosure should not be construed as limited to the particular shapes of regions illustrated herein but are to include deviations in shapes that result, for example, from manufacturing. In the drawings, respective components may be enlarged or reduced in size for convenience of explanation.

Hereinafter, the present disclosure will be described with reference to the drawings for explaining an apparatus for controlling a display mirror for a vehicle according to exemplary embodiments of the present disclosure.

FIG. 1 is a block diagram showing an apparatus for controlling a display mirror for a vehicle according to an exemplary embodiment of the present disclosure. Referring to FIG. 1, an apparatus 1 for controlling a display mirror for a vehicle according to an exemplary embodiment of the present disclosure may include an operation mode determiner 100, a power supply 200, and a controller 300.

The operation mode determiner 100 may determine an operation mode of the display mirror for the vehicle. In an exemplary embodiment of the present disclosure, the display mirror for the vehicle may be operated in one of a first operation mode for reflecting an image corresponding to a rear view to the driver and a second operation mode for displaying an image obtained by an imaging device.

In an exemplary embodiment of the present disclosure, the second operation mode may display a rear-view image obtained by a rear-view imaging device of the vehicle. However, the present disclosure is not limited thereto. The second operation mode may display images obtained by various imaging devices installed in the vehicle as well as the rear-view imaging device of the vehicle, and may display vehicle-related information to allow the driver to perceive a vehicle status or surrounding conditions of the vehicle.

Figure 2:
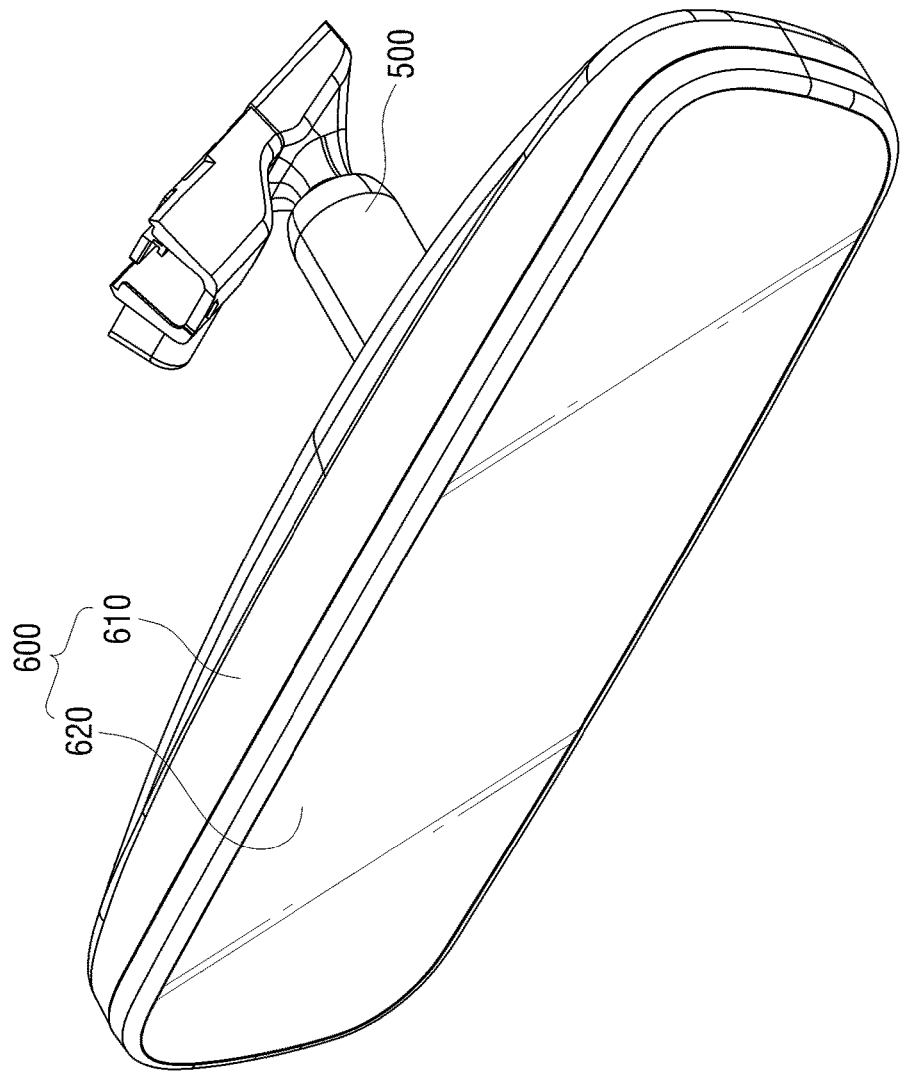
FIG. 2 is a perspective view of a display mirror for a vehicle according to an exemplary embodiment of the present disclosure.
Figure 3:
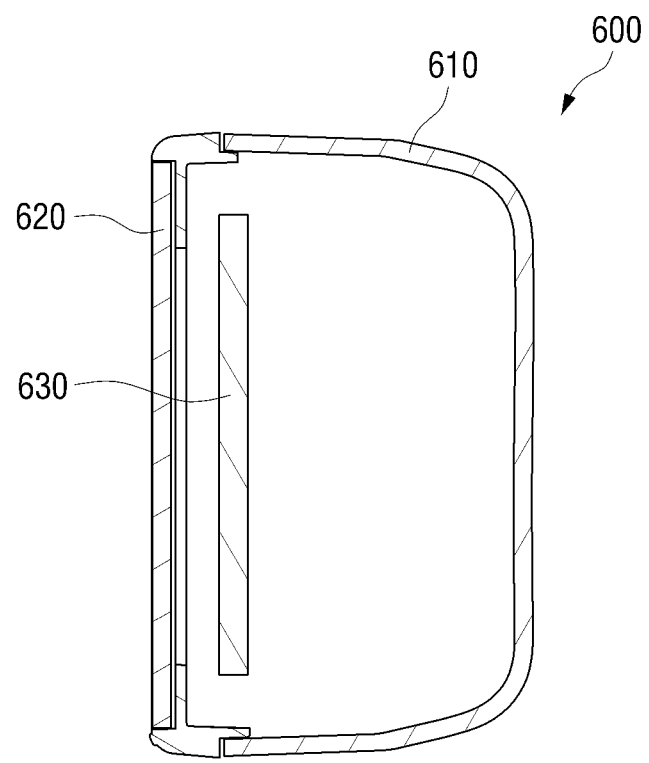
FIG. 3 is a cross-sectional view of a display mirror for a vehicle according to an exemplary embodiment of the present disclosure.

FIG. 2 is a perspective view of a display mirror for a vehicle according to an exemplary embodiment of the present disclosure, and FIG. 3 is a cross-sectional view of a display mirror for a vehicle according to an exemplary embodiment of the present disclosure. Referring to FIGS. 2 and 3, the display mirror for the vehicle according to the exemplary embodiment of the present disclosure may include a stay 500 disposed at an upper portion of a front windshield of the vehicle and a mirror assembly 600 mounted on the stay 500. The mirror assembly 600 may include a mirror housing 610 and a mirror 620 coupled to a surface of the mirror housing 610. A display 630 for displaying an image obtained by an imaging device may be disposed within an internal space formed by the combination of the mirror housing 610 and the mirror 620. In addition, a semi-transmissive or semi-reflective mirror may be used as the mirror 620 to allow the image displayed from the display 630 to be shown to the driver.

Figure 4:
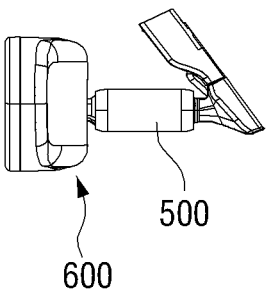
FIG. 4 is a schematic diagram showing a position of a mirror assembly in accordance with an operation mode of a display mirror for a vehicle according to an exemplary embodiment of the present disclosure.
Figure 4:
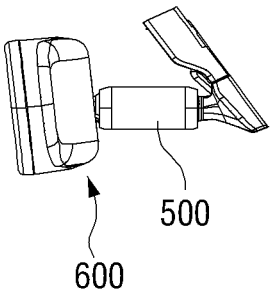
Figure 5:
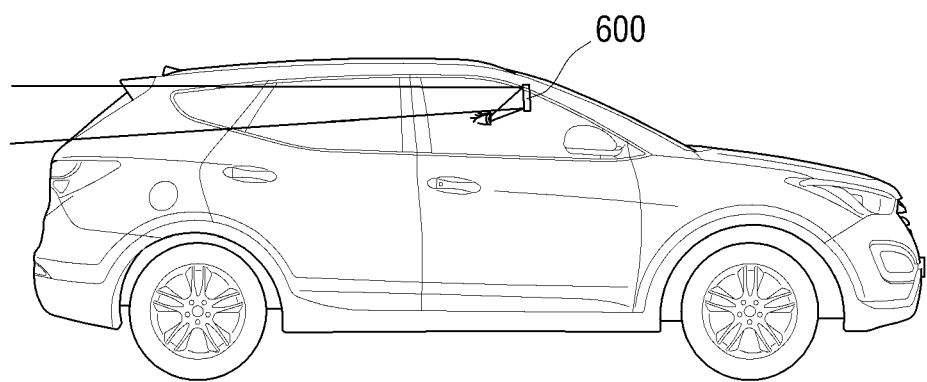
FIG. 5 is a schematic view showing a field of view reflected by a mirror and shown in a first operation mode according to an exemplary embodiment of the present disclosure.

The display mirror for the vehicle may operate in one of the first operation mode and the second operation mode depending on a position of the mirror assembly 600 as shown in FIG. 4. The mirror assembly 600 may be positioned in one of a first position and a second position depending on the operation mode. For example, the mirror assembly 600 may include one of a first position at which an image corresponding to a rear view through a rear windshield of the vehicle is reflected by the mirror 620 to be visible to the driver as shown in FIG. 5 and a second position at which the image corresponding to the rear view through the rear windshield of the vehicle is not visible to the driver through the mirror 610 as shown in FIG. 6.

The display mirror for the vehicle may operate in a first operation mode when the mirror assembly 600 is in the first position, and it may operate in a second operation mode when the mirror assembly 600 is in the second position. In particular, in the second operation mode, the image corresponding to the rear view through the rear windshield of the vehicle may be not visible to the driver through the mirror 620. This configuration may address a problem that, when the image reflected by the mirror 620 and the image displayed by the display 630 overlap each other, it is difficult for the driver to perceive the rear view accurately. For example, when the display 630 displays a rear-view image obtained by the rear-view imaging device, a rear-view image reflected by the mirror 620 and shown to the driver and a rear-view image displayed from the display 630 may have different views. Therefore, when the rear-view image reflected by the mirror 620 and the image displayed from the display 630 overlap each other, it may be difficult for the driver to perceive the rear view accurately.

Figure 6:
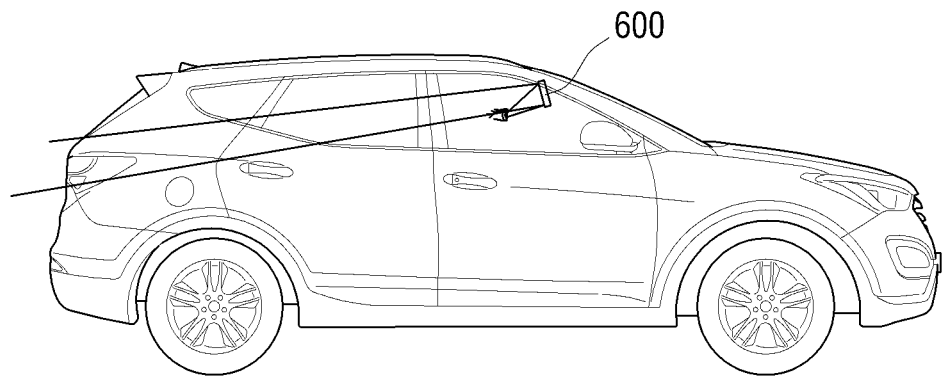
FIG. 6 is a schematic view showing a field of view reflected by a mirror and shown in a second operation mode according to an exemplary embodiment of the present disclosure.

In FIG. 6 as described above, when the mirror assembly 600 is in the second position, the mirror 620 may be positioned downward relative to the first position. However, the present disclosure is not limited thereto, and in the second position, the mirror assembly 600 may be positioned to allow the mirror 620 to face upward relative to the first position. In an exemplary embodiment of the present disclosure, the mirror assembly 600 may be in different positions based on the operation mode of the display mirror for the vehicle. However, the present disclosure is not limited thereto. Even when the operation mode is changed, the mirror assembly 600 may maintain one of the first position and the second position if the rear view may be secured without changing the position of the mirror assembly.

Figure 7:
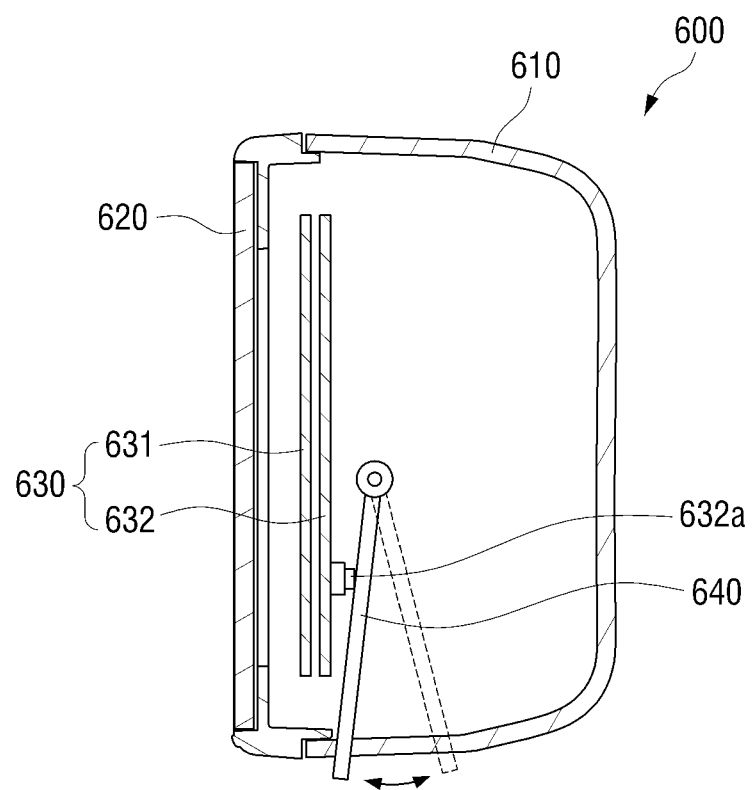
FIG. 7 is a schematic view showing a lever for selecting an operation mode of a display mirror for a vehicle according to an exemplary embodiment of the present disclosure.

The operation mode determiner 100 may determine an operation mode of the display mirror for the vehicle. In an exemplary embodiment of the present disclosure, as shown in FIG. 7, the operation mode determiner 100 may determine an operation mode based on a position of a lever 640 provided in the mirror assembly 600 to allow the driver to select an operation mode. For example, when the display 630 includes a display panel 631 for displaying an image and a PCB 632 for controlling an operation of the display panel 631 and/or for controlling a power supplied to the display panel 631, and the PCB 632 includes a switch 632a operated by the lever 640, the operation mode determiner 100 may determine an operation mode of the display mirror for the vehicle via an operation signal output from the switch 632a based on the position of the lever 640 operated by the driver. The operation mode determiner 100 may determine the first operation mode when the lever 640 is spaced apart from the switch 632a, and it may determine the second operation mode when the lever 640 is positioned to press the switch 632a.

Further, the mirror assembly 600 may be changed from one of the first position and the second position to the other when the lever 640 is operated. The power supply 200 may supply a power for displaying an image on the display 630, and may supply a power of different intensities based on the brightness of the image displayed on the display 630. The controller 300 may adjust the power supply 200 to supply a power of the intensity corresponding to the operation mode according to the determination of the operation mode determiner 100 to the display 630.

The controller 300 may cause a first intensity power to be supplied to the display 630 in the first operation mode, and may cause a second intensity power to be supplied to the display 630 in the second operation mode. In an exemplary embodiment of the present disclosure, the controller 300 may maintain the display 630 in the turned-on state in the first operation mode and the second operation mode, and may supply a power of different strength in each operation mode. In other words, the controller 300 may supply a power to the display 630 with an intensity that is less than an intensity of the second operation mode to allow the image corresponding to the rear view to be reflected by the mirror 620 to be shown to the driver, and the display 630 may remain turned on even in the first operation mode in which an image is not displayed on the display 630.

Increasing the intensity of the power supplied to the display 630 may mean that the brightness of the image displayed on the display 630 is increased, and decreasing the intensity of the power supplied to the display 630 may mean that the brightness of the image displayed on the display 630 is decreased. As such, in the first operation mode, when a power of a smaller intensity is supplied compared to the second operation mode without turning off the display 630, the driver may check the vehicle-related information via the display mirror for the vehicle even in the first operation mode, thereby improving the utilization of the display 630.

The vehicle-related information may include vehicle state information, vehicle surrounding state information, or the like. In particular, the vehicle state information may include time information, driving speed, driving direction, shift stage, or a combination thereof, and the vehicle surrounding state information may include blind spot information, obstacle information, road information, ambient brightness, weather information, or a combination thereof. However, the present disclosure is not limited thereto, and the vehicle-related information may include a variety of information that may help the driver during the operation of the vehicle.

Figure 8:
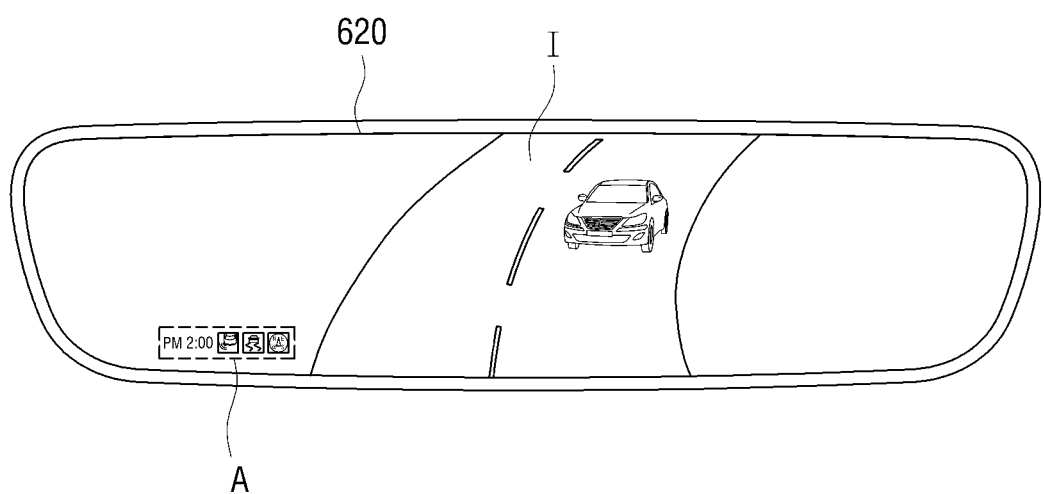
FIG. 8 is a schematic view showing vehicle-related information displayed through a display in a first operation mode according to an exemplary embodiment of the present disclosure.

The controller 300 may cause to display the aforementioned vehicle-related information in an icon, text, pattern, or a combination thereof via the display 630 in the first operation mode, and may cause them to be displayed near an edge of the mirror 620 to prevent the driver from being obscured in perceiving the rear view via the mirror 620. For example, as shown in FIG. 8, in the first operation mode, the controller 300 may cause to display vehicle-related information A near an edge of the mirror 620 while an image I corresponding to the rear view of the vehicle is reflected by the mirror 620 and shown to the driver. As an example, FIG. 8 shows time information, blind spot information (rear vehicle approach), road information (ice road), driving direction (compass), and the like as vehicle-related information. However, the present disclosure is not limited thereto, the vehicle-related information A displayed in the first operation mode may be variously changed.

The vehicle-related information A of FIG. 8 may be information that is provided when the display 630 is in the on-state, i.e., in the second operation mode. In the exemplary embodiment of the present disclosure, the display 630 may be maintained in the on-state even in the first operation mode in which the image I corresponding to the rear view of the vehicle is reflected by the mirror 620 and shown to the driver. Therefore, various vehicle-related information A as described above may be provided to the driver, and thereby improving the driver's convenience.

Even when a decreased power is supplied to the display 630 in the first operation mode, the driver's visibility may be degraded due to the light leakage phenomenon of the display 630. Therefore, the controller 300 may cause to display a black image on the entire display 630 to prevent the driver's visibility from being degraded due to the light leakage from the display 630.

The controller 300 may cause the power of a smaller intensity to be supplied in the first operation mode than the second operation mode, and may adjust the intensity of the power supplied to the display 630 based on the ambient brightness within the vehicle in the second operation mode. In particular, the apparatus 1 for controlling the display mirror for the vehicle of the present disclosure may further include an illuminance sensor 400 capable of detecting the ambient brightness within the vehicle. For example, when the display mirror for the vehicle is operated in the first operation mode, the controller 300 may cause the power to be supplied in less than about 1% with respect to the intensity of power for the display 630 at the maximum brightness. Further, the controller 300 may adjust the intensity of power supplied to the display 630 based on the ambient brightness in the second operation mode.

In other words, when the display mirror for the vehicle is operated in the second operation mode, the controller 300 may cause the power of about 20 to about 80% of the maximum brightness to be supplied to the display 630 based on the ambient brightness of the vehicle during high ambient light conditions (e.g., day time), and may cause the power of about 1 to about 20% of the maximum brightness to be supplied to the display 630 at low ambient light conditions (e.g., night time). The intensity of power supplied to the display 630 based on the operation mode of the display mirror for the vehicle or the ambient brightness of the vehicle is not limited to the above examples, and the power of various intensities may be supplied to allow the driver to obtain optimal visibility in each operation mode.

Figure 9:
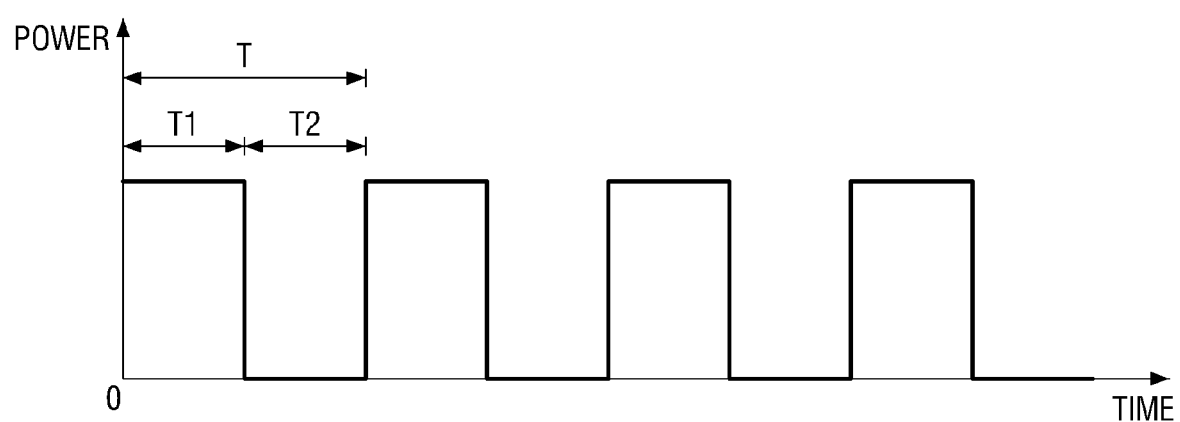
FIG. 9 is a schematic view showing a control signal output from a controller according to an exemplary embodiment of the present disclosure.

In an exemplary embodiment of the present disclosure, the intensity of power supplied from the power supply 200 to the display 630 may be controlled based on the duty ratio of a PWM signal output from the controller 300. However, the present disclosure is not limited thereto, and the intensity of the power supplied to the display 630 may be controlled in various ways such as a voltage signal or serial communication. For example, the PWM signal output from the controller 300 may include an on-interval T1 and an off-interval T2 with a predetermined period T as shown in FIG. 9, and the intensity of the power supplied to the display 630 may be varied based on the ratio of the on-interval T1 and the off-interval T2, thereby allowing adjustment of the brightness of the display 630. For example, as the on-interval T1 of the PWM signal may become longer, the intensity of the power becomes greater, thereby increasing the brightness of the display 630. As the on-interval T1 becomes shorter, the intensity of the power may become less, thereby decreasing the brightness of the display 630.

Figure 10:
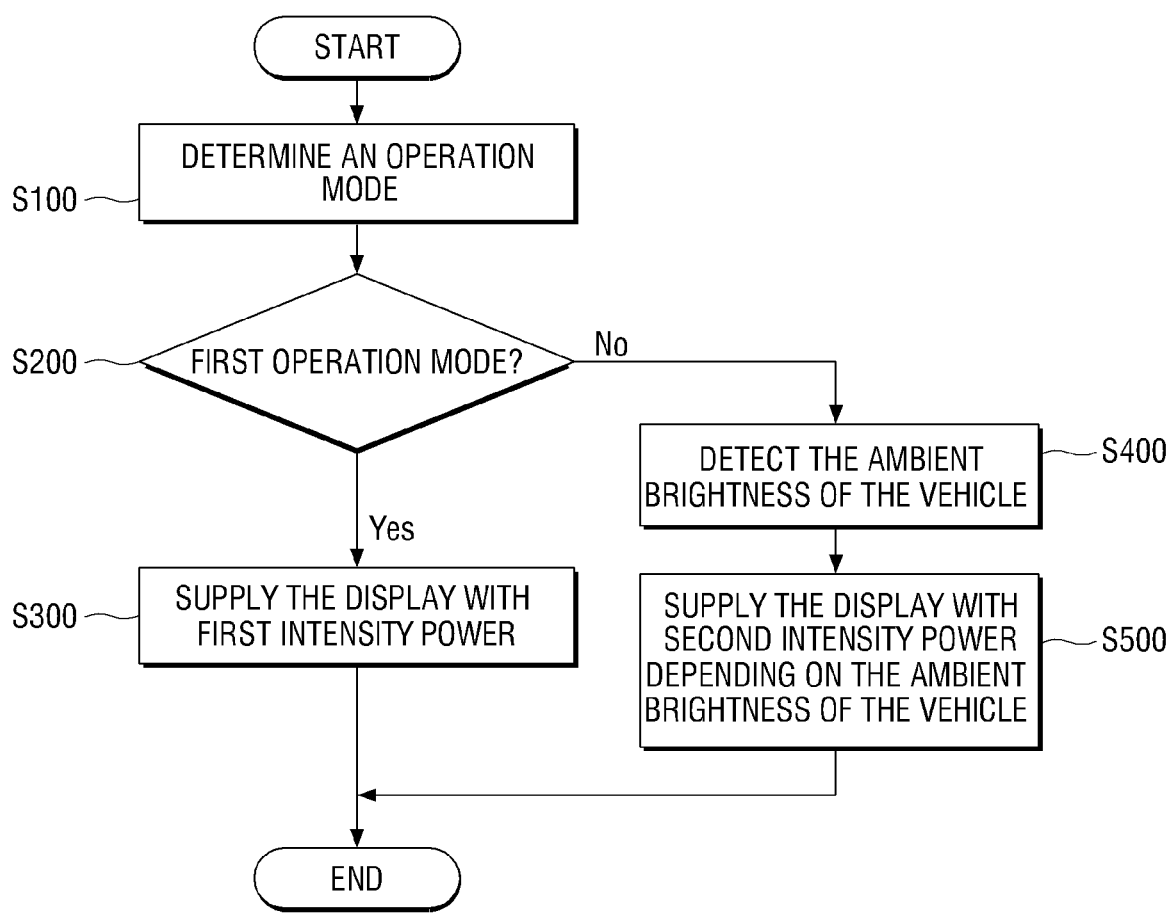
FIG. 10 is a flowchart showing a method for controlling a display mirror for a vehicle according to an exemplary embodiment of the present disclosure.

FIG. 10 is a flowchart showing a method for controlling a display mirror for a vehicle according to an exemplary embodiment of the present disclosure. Referring to FIG. 10, in the method for controlling the display mirror for the vehicle according to the exemplary embodiment of the present disclosure, first, the operation mode determiner 100 may determine the operation mode of the display mirror for the vehicle (S100). In other words, the operation mode determiner 100 may determine whether the display mirror for the vehicle operates in the first operation mode or the second operation mode.

When the display mirror for the vehicle operates in the first operation mode (S200), the controller 300 may cause the first intensity power to be supplied the display 630 (S300). It may be understood that supplying the first intensity power to the display 630 may mean that the power of intensity to decrease the brightness of the display 630 is supplied to allow the driver to more easily perceive the rear view via the mirror 520 without any inconvenience.

In Step S200 described above, when the display mirror for the vehicle is operated in the second operation mode, the ambient brightness of the vehicle may be detected (S400), and the second intensity power may be supplied (S500), in which the second intensity power allows the display 630 to have the brightness to ensure the visibility of the driver based on the detected ambient brightness of the vehicle.

As described above, the apparatus 1 for controlling the display mirror for the vehicle of the present disclosure may not turn on or off the display 630 based on the operation mode of the display mirror for the vehicle. Instead, the apparatus 1 for controlling the display mirror for the vehicle of the present disclosure may allow the display 630 to remain turned on, while controlling the intensity of power supplied to the display 630. Therefore, even in the first operation mode in which the image reflected by the mirror 630 is shown to the driver, the vehicle-related information may be displayed on the display 630, thereby improving the convenience of the driver. Further, when the operation mode is switched from the first operation mode to the second operation mode, the operation mode may be switched more quickly than when the display 630 is turned on from the off-state.

In concluding the detailed description, those skilled in the art will appreciate that many variations and modifications can be made to the exemplary embodiments without substantially departing from the principles of the present disclosure. Therefore, the disclosed exemplary embodiments of the present disclosure are used in a generic and descriptive purpose only and not for purposes of limitation.

What is claimed is:

1. An apparatus for controlling a display mirror for a vehicle comprising:
    an operation mode determiner for determining an operation mode based on a position of a mirror assembly, the mirror assembly including a display for displaying a rear-view image obtained by a rear-view imaging device within an inner space formed by a mirror coupled to a surface of a mirror housing;
    a power supply for supplying a power to the display; and
    a controller configured to adjust an intensity of the power supplied to the display based on the determined operation mode,
    wherein the operation mode is selected by a driver of the vehicle,
    wherein the operation mode determiner determines between a first operation mode and a second operation mode,
    wherein the display remains turned on during the first operation mode and the second operation mode,
    wherein, in the first operation mode, a rear image reflected by the mirror is visible to the driver, and vehicle-related information obtained by the rear-view imaging device is displayed on the display, and
    wherein, in the second operation mode, the rear-view image obtained by the rear-view imaging device and the vehicle-related information obtained by the rear-view imaging device are displayed on the display, and
    wherein the mirror assembly is at a first position in the first operation mode,
    wherein the mirror assembly is at a second position, at which the mirror faces upward or downward relative to the first position, in the second operation mode, and
    wherein the display displays the rear-view image obtained by the rear-view imaging device in response to the driver changing the position of the mirror assembly from the first position to the second position.

2. The apparatus of claim 1, wherein the mirror assembly further comprises a lever to allow selection of the operation mode.

3. The apparatus of claim 2, wherein the display comprises:
a display panel; and
a PCB for adjusting the intensity of the power supplied to the display panel,
wherein the PCB comprises a switch operated based on a position of the lever to allow the intensity of the power supplied to the display to be adjusted.

4. The apparatus of claim 1, wherein the controller is configured to cause a first intensity power to be supplied to the display in the first operation mode, and to cause a second intensity power that is greater than the first intensity to be supplied in the second operation mode.

5. The apparatus of claim 4, wherein the controller is configured to cause a black image to be displayed on the display in the first operation mode.

6. The apparatus of claim 1, wherein the controller is configured to cause the power to be supplied in less than about 1% of an intensity of a power for the display at a maximum brightness in the first operation mode.

7. The apparatus of claim 1, wherein the controller is configured to cause vehicle-related information to be displayed on the display in the first operation mode.

8. The apparatus of claim 1, further comprising:
an illuminance sensor for detecting ambient brightness,
wherein the controller is configured to cause the power of different intensities to be supplied to the display based on the detected ambient brightness in the second operation mode.

9. The apparatus of claim 1, wherein the controller outputs a control signal for controlling the intensity of the power to the power supply, and
wherein the power supply is configured to supply the display with the power of an intensity corresponding to a duty ratio of the control signal.

10. The apparatus of claim 9, wherein the control signal comprises an on-interval and an off-interval at regular periods, and
wherein the intensity of the power supplied to the display is varied based on a ratio of the on-interval and the off-interval.

11. The apparatus of claim 1, wherein the vehicle-related information obtained by the rear-view imaging device includes blind spot information, obstacle information, or both.

* * * * *